(12) United States Patent
Davis

(10) Patent No.: US 9,642,447 B1
(45) Date of Patent: May 9, 2017

(54) ELECTRICAL CORD MANAGEMENT APPARATUS

(71) Applicant: Horace Davis, Asheville, NC (US)

(72) Inventor: Horace Davis, Asheville, NC (US)

( * ) Notice: Subject to any disclaimer, the term of this patent is extended or adjusted under 35 U.S.C. 154(b) by 0 days.

(21) Appl. No.: 15/007,897

(22) Filed: Jan. 27, 2016

(51) Int. Cl.
A45F 5/00 (2006.01)
A45F 5/02 (2006.01)

(52) U.S. Cl.
CPC .................................. A45F 5/021 (2013.01)

(58) Field of Classification Search
CPC ........................................................ A45F 5/021
See application file for complete search history.

(56) References Cited

U.S. PATENT DOCUMENTS

| | | | | |
|---|---|---|---|---|
| 3,464,081 A * | 9/1969 | Wisner | A47L 11/38 | 15/321 |
| 3,591,889 A * | 7/1971 | Wisher | A47L 11/38 | 137/606 |
| 5,758,809 A * | 6/1998 | Bonner | A45F 3/14 | 224/259 |
| 5,964,386 A * | 10/1999 | Cote | A45F 5/02 | 224/236 |
| 5,979,851 A * | 11/1999 | Purdy | A45F 5/02 | 224/250 |
| 6,210,213 B1 * | 4/2001 | Stekelenburg | A45F 5/02 | 439/37 |
| 6,279,797 B1 * | 8/2001 | Snyder | A45F 5/02 | 224/268 |
| 6,336,578 B1 * | 1/2002 | Maynard | A45F 5/02 | 224/248 |
| 7,328,486 B2 * | 2/2008 | Farchione | A45F 5/004 | 24/3.12 |
| 7,945,969 B1 * | 5/2011 | Krause | A41D 13/04 | 2/51 |
| 8,132,302 B2 * | 3/2012 | Wilkinson | B65H 75/366 | 224/254 |
| 8,366,058 B2 * | 2/2013 | Tiedemann, Sr. | H02G 3/30 | 128/DIG. 26 |
| 8,505,170 B1 * | 8/2013 | Gray | A45F 5/021 | 24/3.12 |
| 2003/0201287 A1 * | 10/2003 | Fisher | A45F 5/021 | 224/268 |
| 2010/0001028 A1 * | 1/2010 | Titshaw | A45F 5/00 | 224/251 |

(Continued)

*Primary Examiner* — Justin Larson
(74) *Attorney, Agent, or Firm* — Gulf Coast Intellectual Property Group

(57) ABSTRACT

An electrical cord management apparatus that is operable to position an electrical cord of a electrically powered device being held by a user such that the electrically powered device is in front of the user wherein the electrical cord management apparatus is configured to maintain the electrical cord extending outward from the electrically powered device behind the user. The electrical cord management device includes a planar body having a first slot and a second slot configured to releasably secure the body to a user. Extending outward from the body away from a user is a support arm. The support arm extends outward and is further mounted to extend at a downward angle so as to maintain a desired position of the electrical cord engaged therewith. The support arm a keeper secured thereto that is operable to releasably secure a portion of an electrical cord therein.

8 Claims, 2 Drawing Sheets

(56) References Cited

U.S. PATENT DOCUMENTS

| | | | | |
|---|---|---|---|---|
| 2011/0240694 A1* | 10/2011 | Jackson | ............... | A45F 5/02 |
| | | | | 224/255 |
| 2011/0290833 A1* | 12/2011 | Koerner | ............... | A45F 5/02 |
| | | | | 224/222 |
| 2012/0074185 A1* | 3/2012 | Hoffer | ............... | A45F 5/021 |
| | | | | 224/251 |

* cited by examiner

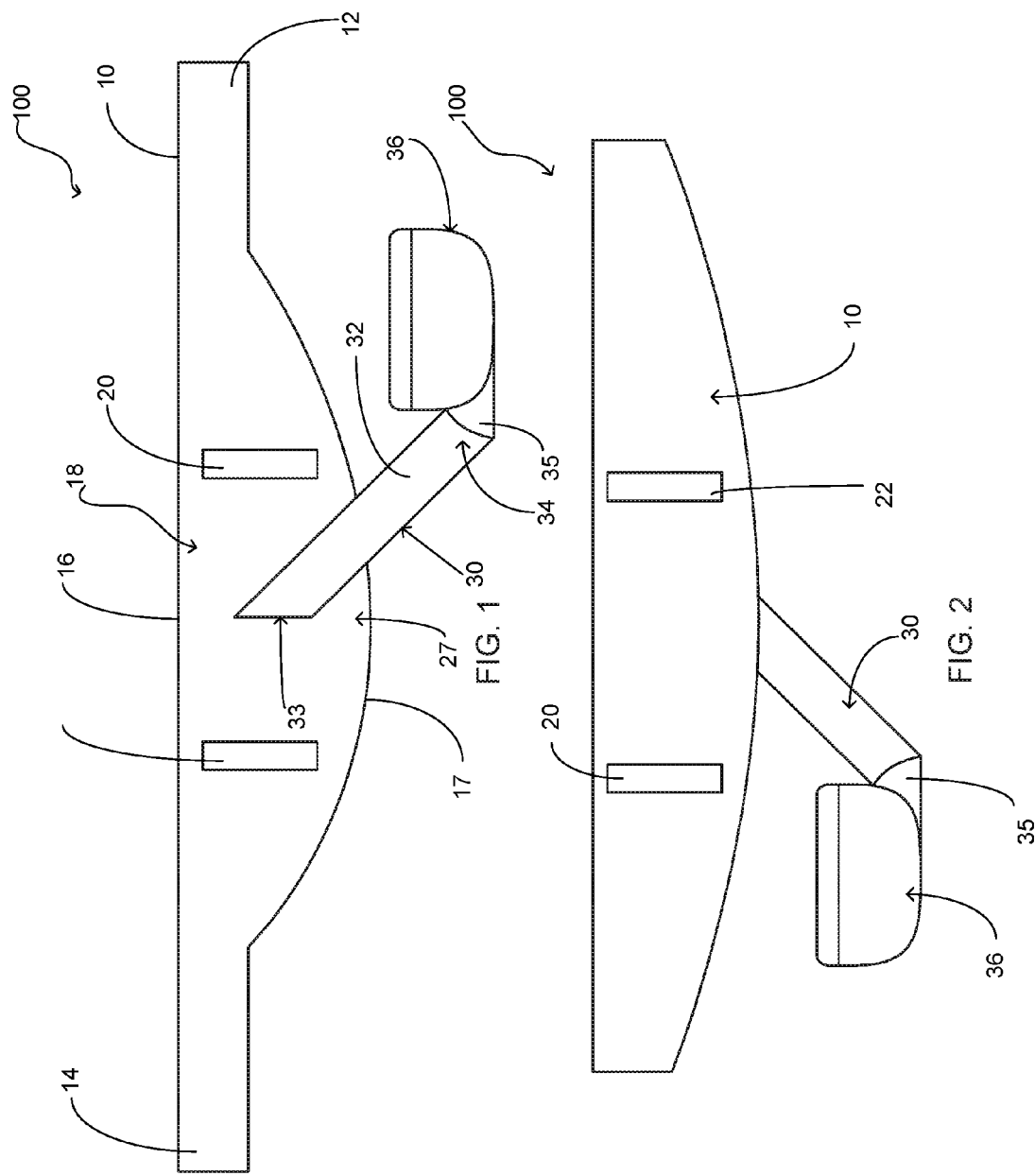

ELECTRICAL CORD MANAGEMENT APPARATUS

FIELD OF THE INVENTION

The present invention relates generally to holding and safety devices, more specifically but not by way of limitation, an electrical cord management apparatus that is releasably secured to the body of a user that is configured to engage a portion of an electrical cord so as to inhibit the electrical cord from suspending in front of a user when connected to a power tool being utilized by a user.

BACKGROUND

Millions of individual regularly utilize apparatus that require electricity. Items such as hand tools, yard tools and the like are often powered by electrical power. While some of the aforementioned items operate on combustible engine and/or battery power, many of these items utilize electric motors that require the item to be operably coupled to a power source via a conventional electrical cord. These items include tools such as but not limited to drills and yard tools such as hedge trimmers.

One issue when utilizing items such as the aforementioned is the safety hazard presented by the electrical cord dangling from the tool. Most tools are held by the user during use such that the tool is in front of the user. This typically places the electrical cord in between the tool being held by the user and the user. This position is undesirable for many reasons. First, the dangling cord can present a tripping hazard for the user. By way of example but not limitation, during use of a conventional electric hedge trimmer, a user will walk adjacent to hedges that are being trimmed. As the user walks along the hedges to execute the task of trimming the hedges, the portion of the electrical cord that is dangling from the tool represents a tripping hazard for the user. Another issue with items such as but not limited to hand tools, is the probability that the portion of the electrical cord suspending downward from the tool can become entrapped in the tool during use. For example but not by way of limitation, during use of a car buffer it can be common for the electrical cord suspending downward therefrom to be caught in the rotating head of the buffer. This can either damage or destroy the cord and potentially shock the user of the car buffer.

Accordingly, there is a need for an electrical cord management apparatus that is configured to assist a user during the use of an electrically powered device to maintain the electrical cord in a position that eliminates the aforementioned hazards.

SUMMARY OF THE INVENTION

It is the object of the present invention to provide an electrical cord management apparatus that is operable to maintain the position of an electrical cord extending outward from a device that is being utilized by a user wherein the electrical cord management apparatus maintains the electrical cord in a position such that the electrical cord is behind the user.

Another object of the present invention is to provide an electrical cord management apparatus that is operable to maintain an electrical cord coupled to a device being used by a wearer of the electrical cord management apparatus wherein the electrical cord management apparatus includes a body that is planar in manner and configured to be releasably secured to the lower back of a user.

A further object of the present invention is to provide an electrical cord management apparatus that is operable to maintain the position of an electrical cord extending outward from a device that is being utilized by a user wherein the electrical cord management apparatus maintains the electrical cord in a position such that the electrical cord is behind the user wherein the body has mounting slots formed therein that are operable to receive a belt therethrough.

Still another object of the present invention is to provide an electrical cord management apparatus that is operable to maintain an electrical cord coupled to a device being used by a wearer of the electrical cord management apparatus wherein the electrical cord management apparatus includes a support arm, the support arm being centrally located on the body and extending outward therefrom.

An additional object of the present invention is to provide an electrical cord management apparatus having a support arm wherein the support arm extends outward from the body and further is angled downward approximately twenty to thirty degrees below perpendicular.

Yet a further object of the present invention is to provide an electrical cord management apparatus having a support arm wherein the support arm that further includes hook portion on the end of the support arm that is configured to releasably secure a portion of an electrical cord.

Another object of the present invention is to provide a an electrical cord management apparatus that is operable to maintain the position of an electrical cord extending outward from a device that is being utilized by a user wherein the electrical cord management apparatus is manufactured from rubber.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 1 is a front view of the preferred embodiment of the present invention; and FIG. 2 is a rear view of the preferred embodiment of the present invention.

DETAILED DESCRIPTION

Figure 3:
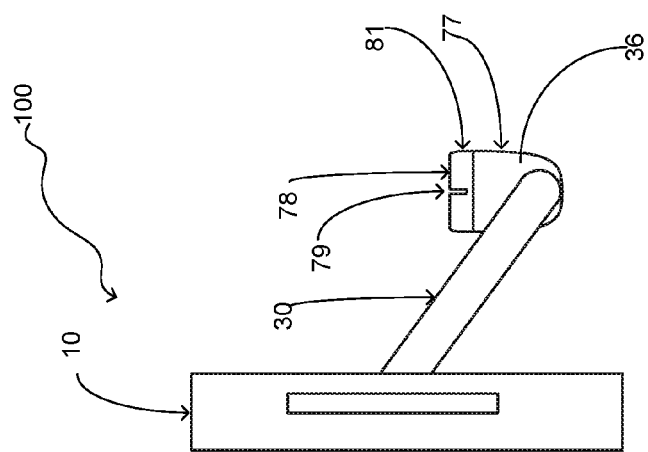
FIG. 3 is a side view of the preferred embodiment of the present invention.

Referring now to the drawings submitted herewith, wherein various elements depicted therein are not necessarily drawn to scale and wherein through the views and figures like elements are referenced with identical reference numerals, there is illustrated a electrical cord management apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring now to the drawings submitted herewith, the electrical cord management apparatus 100 includes a body 10 that is planar in manner and manufactured from a suitable durable and non-conductive material such as but not limited to rubber. The body 10 includes a first end 12 and second end 14 and is configured to be placed adjacent the lower back of a user. While no particular size of the body is required, good results have been achieved utilizing a body 10 that is approximately seven inches in length and five inches in width intermediate the upper edge 16 and lower edge 17 at the widest point 18 thereof. It is contemplated within the scope of the present invention that the body 10 could be manufactured in various different shapes and sizes and achieve the desired functionality as described herein.

As the body 10 is manufactured from rubber or a similar material, it is operable to be placed adjacent a lower back of a user and secured thereto. The body 10 includes a first slot 20 and a second slot 22 that proximate first end 12 and second end 14 respectfully. The first slot 20 and second slot 22 are configured to receive a belt or similar object therethrough so as to assist in the releasable securing of the electrical cord management apparatus 100 to a user. While a first slot 20 and second slot 22 are illustrated and discussed herein as being configured to assist in the releasable securing of the electrical cord management apparatus 100 to a body of a user, it is contemplated within the scope of the present invention that the body 10 could be configured with various elements operable to releasably secure the electrical cord management apparatus 100 to a user.

Integrally secured to the body 10 proximate the midpoint 27 thereof is a support arm 30. The support arm 30 is manufactured from a suitable rigid material such as but not limited to rubber and includes first portion 32 having a first end 33 and second end 34. The first end 33 is secured to the body 10 utilizing suitable durable techniques and is secured such that the first portion 32 extends downward from the body 10 at an angle that is approximately twenty to thirty degrees less than that of perpendicular from the body 10. The downward angle of the first portion 32 of the support arm 30 is operable to position an electrical cord engaged therewith such that the electrical cord is proximate the lower back of a user. This position and management of the electrical cord is desired in order to maintain an electrical cord that is operably coupled to a power tool or similar item wherein the power tool is being held by a user such that the power tool is in front of the user so as to remove the electrical cord from a position that could create a hazardous situation. The electrical cord management apparatus 100 is operable to engage an electrical cord extending outward from a power tool or similar item so as to maintain the electrical cord in a position such that the electrical cord is held behind the user. This provides an improvement in the safety conditions during operation of the power tool.

The support arm 30 includes a second portion 35 and keeper 36 that are integrally formed. The second portion 35 is formed with the first portion utilizing suitable durable techniques and is perpendicular thereto. The keeper 36 is secured to the second portion 35 and is movable with respect thereto. The keeper 36 includes body 77 that is manufactured from a flexible insulative material such as but not limited to rubber. Keeper 36 includes upper surface 78 that has a channel 79 formed therein. The channel 79 extends the length of the upper surface 78 and is operable to receive a portion of an electrical cord therein and maintain frictional engagement therewith. The channel 79 is formed in the upper portion 81 of the keeper 36. The upper portion 81 is manufactured from a suitable pliable material so as to promote a biased engagement with a portion of an electrical cord ensuing placement in the channel 79. The aforementioned engagement promotes maintenance of a portion of the electrical cord in the keeper 36 so as to maintain an electrical cord attached to a tool that is being utilized by a user in a safe position such that the electrical cord is maintained in a position behind the user.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An electrical cord management apparatus operable to maintain an electrical cord extending outward from a power tool wherein the electrical cord is maintained in a position such that the electrical cord is behind a user of the electrical cord management apparatus comprising:

a body, said body being planar in manner and flexible, said body configured to be placed adjacent a user's lower back; and a support arm, said support arm being integrally secured to said body and extending outward therefrom, said support arm having a first portion wherein the first portion includes a first end and a second end, said first end of said first portion secured to said body, said support arm being secured to said body such that said support arm is positioned in a downward angle relative to said body; and wherein said support arm further includes a keeper secured thereto, said keeper including an upper surface having a channel formed therein and extending an entire length thereof, said channel operable to receive a portion of an electrical cord therein.

2. The electrical cord management apparatus as recited in claim 1, wherein said body further includes a first end and a second end, said body further having an upper edge and a lower edge, said body having a midpoint wherein said body is greater in width proximate said midpoint.

3. The electrical cord management apparatus as recited in claim 2, wherein said body further includes a first slot, said first slot being proximate said first end of said body.

4. The electrical cord management apparatus as recited in claim 3, wherein said body further includes a second slot, said second slot being proximate said second end of said body.

5. An electrical cord management apparatus operable to maintain an electrical cord extending outward from an electrically powered device behind a user that is engaged with the electrically powered device wherein the electrically powered device is being held in front of a user comprising:

a body, said body being planar in manner and flexible, said body configured to be placed adjacent a user's lower back, said body having a first end and a second end, said body having an upper edge and a lower edge, said body further having a midpoint, said body having a first slot proximate said first end, said body further having a second slot proximate said second end; and a support arm, said support arm being integrally secured to said body and extending outward therefrom, said support arm having a first portion wherein the first portion includes a first end and a second end, said first end of said first portion secured to said body, said support arm further including a second portion, said second portion being integrally formed with said second end of said first portion;

a keeper, said keeper being secured to said second portion of said support arm, said keeper having a body, said body of said keeper having an upper surface, said upper surface of said body of said keeper having a channel formed therein and extending an entire length thereof; and wherein said channel is configured to releasably secure a portion of an electrical cord when placed therein.

6. The electrical cord management apparatus as recited in claim 5, wherein said upper portion of said body of said keeper is manufactured from a pliable material.

7. The electrical cord management apparatus as recited in claim 6, wherein said body is manufactured from rubber.

8. The electrical cord management apparatus as recited in claim 7, wherein said keeper is manufactured from an insulative material.

* * * * *